(12) United States Patent
Yoshida (10) Patent No.: US 7,375,865 B2
(45) Date of Patent: May 20, 2008

(54) FACSIMILE APPARATUS AND FACSIMILE COMMUNICATION METHOD

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 932 days.

(21) Appl. No.: 10/683,397

(22) Filed: Oct. 14, 2003

(65) Prior Publication Data

US 2004/0075850 A1   Apr. 22, 2004

(30) Foreign Application Priority Data

Oct. 15, 2002   (JP) .............................. 2002-300969
Sep. 10, 2003   (JP) .............................. 2003-318543

(51) Int. Cl.
*H04N 1/46* (2006.01)
*H04N 1/40* (2006.01)
*H04N 1/00* (2006.01)
*G06F 3/12* (2006.01)

(52) U.S. Cl. ...................... 358/500; 358/468; 358/434; 358/1.15

(58) Field of Classification Search ................ 358/1.9, 358/1.15, 400, 404, 426.12, 426.14, 438, 358/439, 442, 500, 508, 518, 426.1, 434, 358/435, 436, 448; 709/227, 230
See application file for complete search history.

(56) References Cited

U.S. PATENT DOCUMENTS

| | | | |
|---|---|---|---|
| 4,554,592 A | 11/1985 | Yoshida | 358/257 |
| 4,609,927 A | 9/1986 | Yoshida | 346/154 |
| 4,677,660 A | 6/1987 | Yoshida | 379/100 |
| 4,727,576 A | 2/1988 | Yoshida | 379/100 |
| 5,255,311 A | 10/1993 | Yoshida | 379/100 |
| 5,345,517 A | 9/1994 | Katayama et al. | 382/54 |
| 5,448,654 A | 9/1995 | Katayama et al. | 382/298 |

(Continued)

FOREIGN PATENT DOCUMENTS

JP   7-177322 A   7/1995

(Continued)

OTHER PUBLICATIONS

ITU-T Recommendation T.30, Procedures for document facsimile transmission in the general switched telephone network, Apr. 1999, p. 49, table 2/T.30.*

(Continued)

*Primary Examiner*—King Y. Poon
*Assistant Examiner*—Peter L Cheng
(74) *Attorney, Agent, or Firm*—Fitzpatrick, Cella, Harper & Scinto (57) ABSTRACT

Disclosed is a color-file communicating facsimile apparatus that is capable of communicating non-document image files through a simple method. A FIF (Facsimile Information Field) is provided with bits indicating that a color file to be transmitted is an sYCC JPEG-encoded file in which the concept of resolution is absent and bits specifying the sYCC full-color mode. If these bits have been set, a transmitting side sets resolution information and image-width information to any values and a receiving side ignores resolution information and image-width information in the FIF and performs print-out using information that has been obtained from header information of the received JPEG file. If these bits have not been set, ordinary transmission, reception and print processing are carried out.

5 Claims, 8 Drawing Sheets

| FIF | DIS | DCS |
|---|---|---|
| 15 | R8×7.7 line/mm or 200dpi×200dpi | R8×7.7 line/mm or 200dpi×200dpi |
| 41 | R8×15.4 line/mm | R8×15.4 line/mm |
| 42 | 300dpi×300dpi | 300dpi×300dpi |
| 43 | R16×15.4 line/mm or 400dpi×400dpi | R16×15.4 line/mm or 400dpi×400dpi |
| 68 | JPEG ENCODING IN Lab COLOR SPACE | JPEG ENCODING IN Lab COLOR SPACE |
| 69 | FULL-COLOR MODE IN Lab COLOR SPACE | FULL-COLOR MODE IN Lab COLOR SPACE |
| 97 | COLOR/GRAYSCALE 300dpi×300dpi or COLOR/GRAYSCALE 400dpi×400dpi | COLOR/GRAYSCALE 300dpi×300dpi or COLOR/GRAYSCALE 400dpi×400dpi |
| 98 | COLOR/GRAYSCALE 100dpi×100dpi | COLOR/GRAYSCALE 100dpi×100dpi |
| 105 | 600dpi×600dpi | 600dpi×600dpi |
| 106 | 1200dpi×1200dpi | 1200dpi×1200dpi |
| 107 | 300dpi×600dpi | 300dpi×600dpi |
| 108 | 400dpi×800dpi | 400dpi×800dpi |
| 109 | 600dpi×1200dpi | 600dpi×1200dpi |
| 110 | COLOR/GRAYSCALE 600dpi×600dpi | COLOR/GRAYSCALE 600dpi×600dpi |
| 111 | COLOR/GRAYSCALE 1200dpi×1200dpi | COLOR/GRAYSCALE 1200dpi×1200dpi |
| X | JPEG ENCODING IN sYCC COLOR SPACE | JPEG ENCODING IN sYCC COLOR SPACE |
| X+1 | FULL-COLOR MODE IN sYCC COLOR SPACE | FULL-COLOR MODE IN sYCC COLOR SPACE |
| 17, 18 | PRINT WIDTH CAPABILITY (0, 0) 215mm (0, 1) 215mm AND 255mm AND 303mm (1, 0) 215mm AND 255mm (1, 1) INVALID | PRINT WIDTH (0, 0) 215mm (0, 1) 303mm (1, 0) 255mm (1, 1) INVALID |
| 19, 20 | MAXIMUM PRINT-LENGTH CAPABILITY (0, 0) A4 (297mm) (0, 1) NO LIMITATION (1, 0) A4 (297mm) AND B4 (364mm) (1, 1) INVALID | MAXIMUM PRINT WIDTH (0, 0) A4 (297mm) (0, 1) NO LIMITATION (1, 0) B4 (364mm) (1, 1) INVALID |
| 76 | NORTH AMERICAN LETTER (215.9×279.4 mm) CAPABILITY | NORTH AMERICAN LETTER (215.9×279.4 mm) |
| 77 | NORTH AMERICAN LEGAL (215.9×355.6 mm) CAPABILITY | NORTH AMERICAN LEGAL (215.9×355.6 mm) |

U.S. PATENT DOCUMENTS

| | | | |
|---|---|---|---|
| 5,619,344 A | 4/1997 | Yoshida et al. | 358/468 |
| 5,659,401 A | 8/1997 | Yoshida | 358/442 |
| 5,682,248 A | 10/1997 | Yoshida | 358/404 |
| 5,724,441 A | 3/1998 | Yoshida | 382/166 |
| 5,966,430 A | 10/1999 | Yoshida | 379/100 |
| 6,088,129 A | 7/2000 | Yoshida | 358/439 |
| 6,275,308 B1 | 8/2001 | Yoshida | 358/450 |
| 6,563,606 B1 | 5/2003 | Yoshida | 358/439 |
| 6,937,356 B1* | 8/2005 | Ito et al. | 358/1.16 |
| 2002/0093698 A1* | 7/2002 | Kagawa | 358/518 |
| 2002/0099778 A1* | 7/2002 | Kogure et al. | 709/206 |
| 2002/0114019 A1 | 8/2002 | Yoshida | 358/450 |
| 2002/0163672 A1 | 11/2002 | Yoshida et al. | 358/400 |
| 2002/0171876 A1 | 11/2002 | Yoshida | 358/400 |
| 2004/0070780 A1* | 4/2004 | Kimoto | 358/1.13 |
| 2004/0075875 A1* | 4/2004 | Kimoto | 358/500 |

FOREIGN PATENT DOCUMENTS

| | | |
|---|---|---|
| JP | 7-177332 A1 | 7/1995 |
| JP | 07-203211 | 8/1995 |
| JP | 2000-022917 | 1/2000 |
| JP | 2002-125089 | 4/2002 |

OTHER PUBLICATIONS

Remarks filed on May 15, 2006 in the Japanese Patent Office in response to the Final Rejection concerning counterpart Japanese Patent Application No. 2003-318543, and a partial English translation thereof.

* cited by examiner

| FIF | DIS | DCS |
|---|---|---|
| 15 | R8 × 7.7 line/mm or 200dpi × 200dpi | R8 × 7.7 line/mm or 200dpi × 200dpi |
| 41 | R8 × 15.4 line/mm | R8 × 15.4 line/mm |
| 42 | 300dpi × 300dpi | 300dpi × 300dpi |
| 43 | R16 × 15.4 line/mm or 400dpi × 400dpi | R16 × 15.4 line/mm or 400dpi × 400dpi |
| 68 | JPEG ENCODING IN Lab COLOR SPACE | JPEG ENCODING IN Lab COLOR SPACE |
| 69 | FULL-COLOR MODE IN Lab COLOR SPACE | FULL-COLOR MODE IN Lab COLOR SPACE |
| 97 | COLOR/GRAYSCALE 300dpi × 300dpi or COLOR/GRAYSCALE 400dpi × 400dpi | COLOR/GRAYSCALE 300dpi × 300dpi or COLOR/GRAYSCALE 400dpi × 400dpi |
| 98 | COLOR/GRAYSCALE 100dpi × 100dpi | COLOR/GRAYSCALE 100dpi × 100dpi |
| 105 | 600dpi × 600dpi | 600dpi × 600dpi |
| 106 | 1200dpi × 1200dpi | 1200dpi × 1200dpi |
| 107 | 300dpi × 600dpi | 300dpi × 600dpi |
| 108 | 400dpi × 800dpi | 400dpi × 800dpi |
| 109 | 600dpi × 1200dpi | 600dpi × 1200dpi |
| 110 | COLOR/GRAYSCALE 600dpi × 600dpi | COLOR/GRAYSCALE 600dpi × 600dpi |
| 111 | COLOR/GRAYSCALE 1200dpi × 1200dpi | COLOR/GRAYSCALE 1200dpi × 1200dpi |
| X | JPEG ENCODING IN sYCC COLOR SPACE | JPEG ENCODING IN sYCC COLOR SPACE |
| X+1 | FULL-COLOR MODE IN sYCC COLOR SPACE | FULL-COLOR MODE IN sYCC COLOR SPACE |
| 17, 18 | PRINT WIDTH CAPABILITY<br>(0, 0) 215mm<br>(0, 1) 215mm AND 255mm AND 303mm<br>(1, 0) 215mm AND 255mm<br>(1, 1) INVALID | PRINT WIDTH<br>(0, 0) 215mm<br>(0, 1) 303mm<br>(1, 0) 255mm<br>(1, 1) INVALID |
| 19, 20 | MAXIMUM PRINT-LENGTH CAPABILITY<br>(0, 0) A4 (297mm)<br>(0, 1) NO LIMITATION<br>(1, 0) A4 (297mm) AND B4 (364mm)<br>(1, 1) INVALID | MAXIMUM PRINT WIDTH<br>(0, 0) A4 (297mm)<br>(0, 1) NO LIMITATION<br>(1, 0) B4 (364mm)<br>(1, 1) INVALID |
| 76 | NORTH AMERICAN LETTER (215.9 × 279.4 mm) CAPABILITY | NORTH AMERICAN LETTER (215.9 × 279.4 mm) |
| 77 | NORTH AMERICAN LEGAL (215.9 × 355.6 mm) CAPABILITY | NORTH AMERICAN LEGAL (215.9 × 355.6 mm) |

FACSIMILE APPARATUS AND FACSIMILE COMMUNICATION METHOD

FIELD OF THE INVENTION

This invention relates to a facsimile transmission technique and, more particularly, to a facsimile transmission technique that makes it possible to transmit color information (inclusive of grayscale information).

BACKGROUND OF THE INVENTION

Conventional facsimile machines are mainly of the type that communicate monochrome information. In the communication of monochrome information, the receiving machine notifies the transmitting machine of its receivable resolution by way of a DIS (Digital Information Signal), and the transmitting machine instructs the receiving machine of the transmitted resolution and document width by way of a DCS (Digital Control Signal). This exchange of control information is performed in similar fashion also in the communication of color information as defined by current ITU-T recommendations.

Further, e.g., JP-A-7-177332 discloses that improving efficiency of facsimile transmission of which originals include a monochrome page and a color page by extending DIS and DCS specified in ITU-T Recommendation T.30 and by informing whether a color page is included in the originals being transmitted or not and information relating to receiving capability of a color original.

At the present time, facsimile machines that communicate color information use JPEG encoding stipulated by ITU-T Recommendation T.82 and execute the transmission of grayscale information and full-color information in Lab color space according to ITU-T Recommendation T.42.

Meanwhile, the rapid popularization of digital cameras in recent years has been accompanied by fast-growing demand for the facsimile transmission of color-file information (color-image information) for color images captured by such cameras. The color space used in a digital camera is sYCC (sRGB-based YCC) and not Lab.

Transmission of JPEG full-color document information in Lab color space in the prior art is strictly transmission of document information, namely information read by a reading unit, in a manner similar to a case where monochrome document information is transmitted as binary information, and therefore resolution and image-width information can be obtained and it is possible to specify resolution and image width in a DCS signal. On the other hand, in the case of JPEG full-color transmission in sYCC color space, there are many instances where the transmission is of image information captured by a digital camera and stored in, e.g., a memory card. However, the concept of resolution is absent from an image file (non-document image information), which is produced without the reading of a document as in the manner of an image file in sYCC color space captured by a digital camera. Consequently, in a case where such an image file is transmitted using the above-described control procedure, it is required that the image width and resolution information specified in the control procedure (DCS) be decided by the number of pixels in the main-scan direction and the number of pixels in the sub-scan direction. This necessitates the task of converting file information.

SUMMARY OF THE INVENTION

Accordingly, an object of the present invention is to so arrange it that when non-document image information such as an image file captured by a digital camera is communicated by facsimile, the information can be sent and received through a more expedient procedure.

According to one aspect of the present invention is provided a facsimile apparatus that is capable of communicating color-file information, comprising determination means for determining whether a received color file is color-file information in a first color space or color-file information in a second color space different from the first color space, and output means. The output means, in a case where color-file information in the first color space is received, execute output processing using resolution information and image-width information reported from a facsimile apparatus of a communicating party by a digital control signal but without using information of X parameter and Y parameter in a received JPEG header, and in a case where color-file information in the second color space is received, execute output processing using information of X parameter and Y parameter in a received JPEG header but without using resolution information and image-width information reported from the facsimile apparatus of the communicating party by the digital control signal.

According to a further aspect of the present invention is provided a facsimile communication method for color-file information, comprising a determination step of determining whether a received color file is color-file information in a first color space or color-file information in a second color space different from the first color space, and an output step. In the output step, in a case where color-file information in the first color space is received, output processing is executed using resolution information and image-width information reported from a facsimile apparatus of a communicating party by a digital control signal but without using information of X parameter and Y parameter in a received JPEG header, while in a case where color-file information in the second color space is received, the output processing is executed using information of X parameter and Y parameter in a received JPEG header but without using resolution information and image-width information reported from the facsimile apparatus of the communicating party by the digital control signal.

According to other aspects of the present invention are provided a program for executing such a method, and a computer-readable storage medium storing such a program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 2 is a diagram illustrating an example of a FIF (Facsimile Information Field) used in the facsimile apparatus according to this embodiment;

DETAILED DESCRIPTION OF THE PREFERRED EMBODIMENT

A preferred embodiment of the present invention will now be described in detail in accordance with the accompanying drawings.

Figure 1:
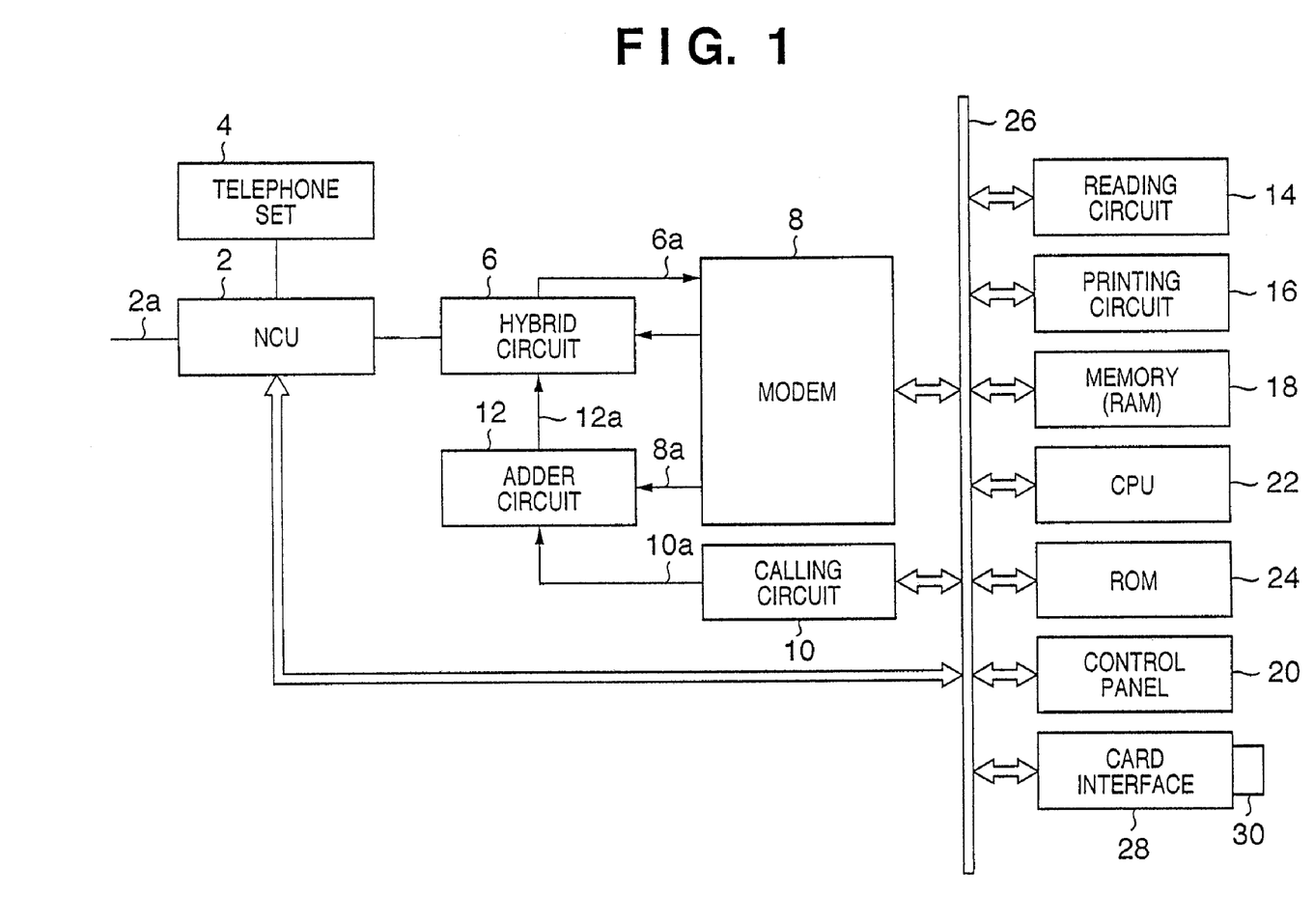
FIG. 1 is a block diagram illustrating an example of the structure of a facsimile apparatus according to an embodiment of the present invention.

FIG. 1 is a block diagram illustrating an example of the structure of a facsimile apparatus according to an embodiment of the present invention.

As shown in FIG. 1, an NCU (network control unit) 2 effects a connection to the terminal of a line in order for a telephone network to be used in data communication or the like, controls the connection of a telephone switching network, effects a changeover to a data communication line and maintains the loop. Further, in response to control from a bus 26, the NCU 2 connects a telephone line 2a to a telephone set (turns CML off) or connects the telephone line 2a to a facsimile apparatus (turns CML on). It should be noted that the telephone line 2a has been connected to the side of a telephone set 4 in FIG. 1.

A hybrid circuit 6 separates signals into a transmit signal and receive signal, sends a transmit signal from an adder circuit 12 to the telephone line 2a via the NCU 2, receives a signal from the side of the communicating party via the NCU 2 and sends the signal to a modem 8 via a signal line 6a.

The modem 8 performs modulation and demodulation that is based upon ITU-T Recommendations V.8, V.21, V.27ter, V.29, V.17 and V.34. Upon which Recommendation modulation/demodulation is to be performed is specified by control on bus 26. A transmit signal from the bus 26 is input to the modem 8, which then outputs modulated data to a signal line 8a. Further, a receive signal being output on the signal line 6a is input to the modem 8, which then outputs demodulated data to the bus 26.

A calling circuit 10 accepts input of telephone-number information in response to a signal from the bus 26 and outputs a STMF select signal to a signal line 10a.

The information on signal line 8a and the information on signal line 10a is input to the adder circuit 12, which proceeds to add this information and output the result to a signal line 12a.

A reading circuit 14, which is capable of reading color, outputs the read data to the bus 26.

A printing circuit 16, which is capable of printing in color, prints information, which is being output on the bus 26, line by line in succession.

A memory circuit 18 is a working memory (RAM). The memory circuit 18 is used to store the raw information of read data or encoded information, and to store received information or encoded information, etc., via the bus 26.

A control panel 20 includes keys for single-button dialing, keys for abbreviated dialing, numeric keys, a * key, a # key, a start key, a stop key, a set key, a key for selecting transmission of color information, a key for selecting transmission of memory-card information, and function keys. Key information obtained by pressing these keys is output to the bus 26.

The control panel 20 further includes a display unit (not shown) for displaying information that is being output to the bus 26.

A CPU (central processing unit) 22 performs overall control of the facsimile apparatus. This includes execution of a facsimile-transmission control procedure. The control program of the CPU 22 is stored in a ROM 24.

A card interface 28 is for using a removable memory card 30.

FIG. 2 illustrates the bit numbers of the FIF (Facsimile Information Field) in a DIS/DTC (Digital Transmit Command) and DCS used in this embodiment, as well as the valid meaning (state) of the bit if the bit is "1". This includes information stipulated by ITU-T Recommendation T.30 and information set anew by the present invention.

Among the FIF bits shown in FIG. 2, the information set forth below is included as information regarding JPEG transmission and transmission of full-color information.

Whether a JPEG receive function in Lab color space exists or not is reported by bit 68 of the FIF in the DIS/DTC, and JPEG transmission in Lab color space is specified by bit 68 of the FIF in the DCS.

Further, whether a full-color receive function in Lab color space exists or not is reported by bit 69 of the FIF in the DIS/DTC, and full-color transmission in Lab color space is specified by bit 69 of the FIF in the DCS.

Further, whether a JPEG receive function in sYCC color space exists or not is reported by bit X of the FIF in the DIS/DTC, and JPEG transmission in sYCC color space is specified by bit X of the FIF in the DCS.

Further, whether a full-color receive function in sYCC color space exists or not is reported by bit (X+1) of the FIF in the DIS/DTC, and full-color transmission in sYCC color space is specified by bit (X+1) of the FIF in the DCS. It should be noted that bit X and bit (X+1) respectively signify a bit number (X) not currently stipulated by Recommendation T.30, and the next bit number (X+1), which is not currently stipulated by Recommendation T.30.

Next, bits 15, 41, 42, 43, 97, 98, 105, 106, 107, 108, 109, 110 and 111 are available as resolution-related information. An explanation of these bits, however, is not given here.

Finally, bits 17, 18, 19, 20, 76 and 77 are available as information relating to document (print) width. An explanation of these bits, however, is not given here.

The ROM 24 stores the control program of CPU 22, as mentioned above. By running the control program stored in ROM 24, the CPU 22 implements operation of the facsimile apparatus of this embodiment, described below, inclusive of a send/receive function equivalent to that of the conventional color facsimile apparatus and a send/receive function of JPEG-encoded information in sYCC color space.

The operation of the facsimile apparatus according to this embodiment will now be described with reference to the flowcharts of FIGS. 3 to 7. The operation illustrated in FIGS. 3 to 7 is implemented by having the CPU 22 run the control program stored in ROM 24 and control each of the elements constituting the facsimile apparatus.

Figure 3:
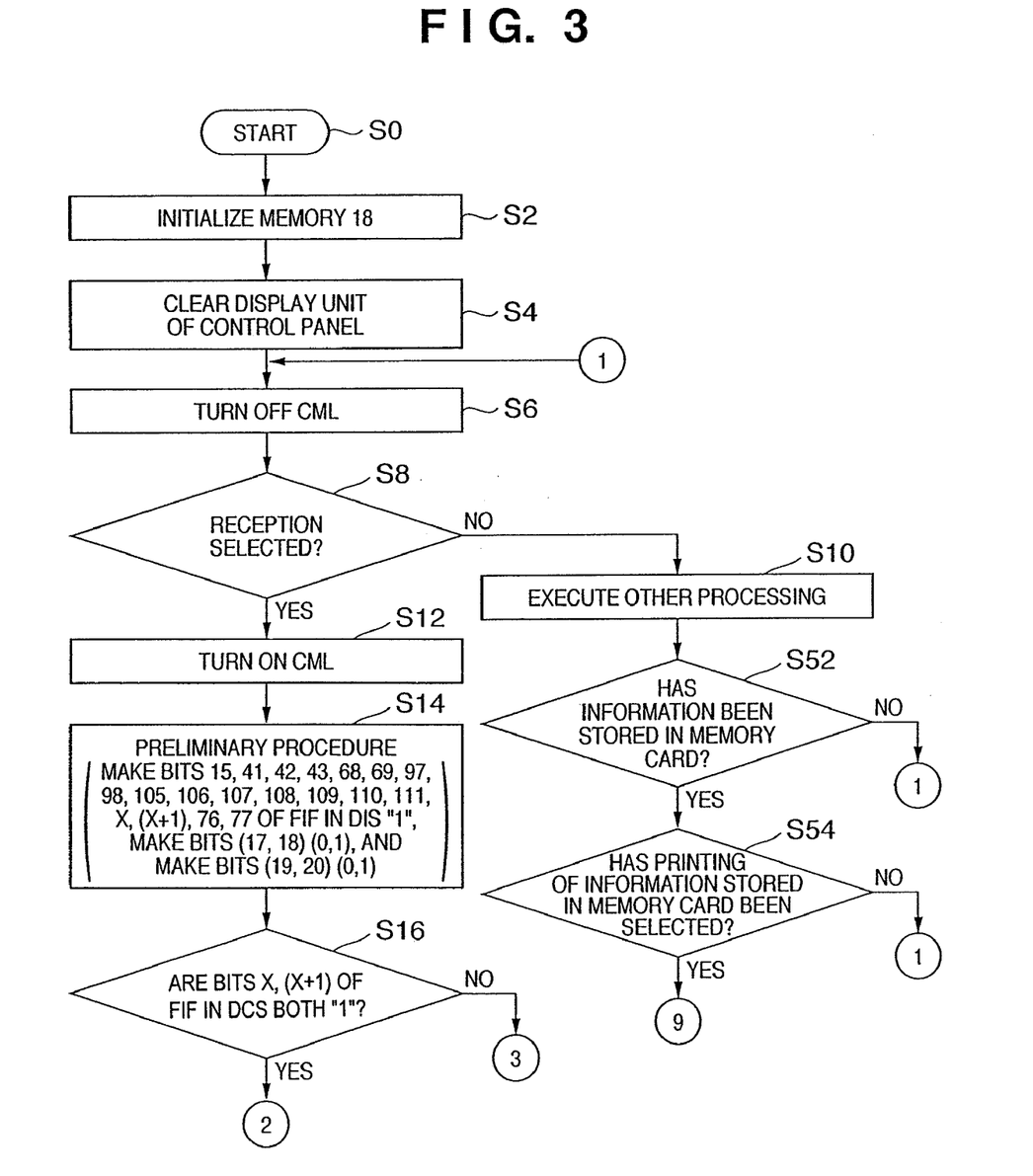
FIG. 3, FIGS. 4A, 4B, FIGS. 5A, 5B, FIGS. 6A to 6C and FIG. 7 are flowcharts for describing the operation of the facsimile apparatus according to this embodiment.

Operation starts at 50 in FIG. 3 and the memory 18 is initialized via the bus 26 at S2. The display unit (not shown) on the control panel 20 is cleared via the bus 26 at S4, and the CML of NCU 2 is turned off (the telephone line 2a is connected to the side of the telephone set) via the bus 26 at S6.

Next, it is determined at S8 whether facsimile reception has been selected (i.e., whether the apparatus is operating as a receiving machine). If the decision rendered is "YES", control proceeds to S12; if the decision is "NO", then control proceeds to S10.

The CML of NCU 2 is turned on (the telephone line 2a is connected to the side of the facsimile apparatus) via the bus 26 at S12.

Step S14 represents a preliminary procedure. Here bits 15, 41, 42, 43, 68, 69, 97, 98, 105, 106, 107, 108, 109, 110, 111, X, (X+1), 76 and 77 of the FIF in the DIS are made "1". Further, bits (17, 18) of the FIF in the DIS are made (0,1), and bits (19, 20) thereof are made (0,1).

It is determined at S16 whether bits X, (X+1) of the FIF in the DCS received from the transmitting side are both "1" (i.e., whether both JPEG encoding in sYCC color space and the full-color mode in sYCC color space have been specified). Control proceeds to S18 (FIG. 4A) if the answer is "YES" and to S24 (FIG. 4B) if the answer is "NO".

Figure 4A:
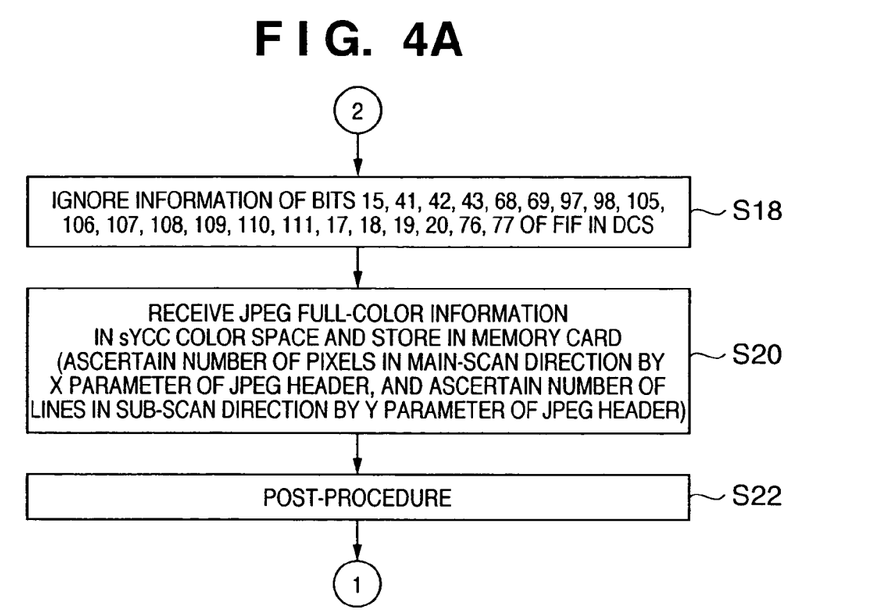

All information of bits 15, 41, 42, 43, 68, 69, 97, 98, 105, 106, 107, 108, 109, 110, 111, 17, 18, 19, 20, 76 and 77 of the FIF in the DCS, namely information of bits other than bits X, (X+1) in FIG. 2, is ignored at S18.

JPEG full-color information in sYCC color space sent from the transmitting side is received and stored in the removable memory card 30 at S20. Here reference is had to the JPEG header to ascertain, by its X parameter, the number of pixels of the received JPEG image in the main-scan direction and, by its Y parameter, the number of lines of the received JPEG image in the sub-scan direction.

A post-procedure is executed at S22 and then control returns to S6.

Figure 4B:
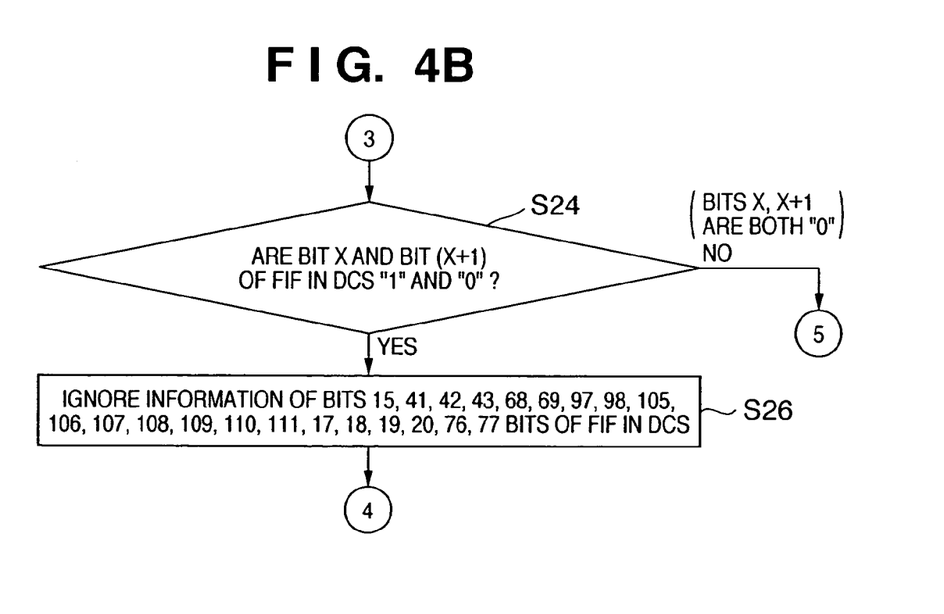

If it is found at S16 that at least one of the bits X, (X+1) of the FIF in the DCS is "0", then it is determined at S24 whether the combination of the bits is "1", "0" for bit X and bit (X+1), respectively, of the FIF in the DCS (i.e., whether the information is JPEG grayscale information in sYCC color space). Control proceeds to step S26 if the decision is "YES", and to step S32 (FIG. 5B) if the decision is "NO" [i.e., bit X and bit (X+1) are both "0"].

At S26, the information of bits 15, 41, 42, 43, 68, 69, 97, 98, 105, 106, 107, 108, 109, 110, 111, 17, 18, 19, 20, 76 and 77 of the FIF in the DCS is neglected in a manner similar to that of step S18.

Figure 5A:
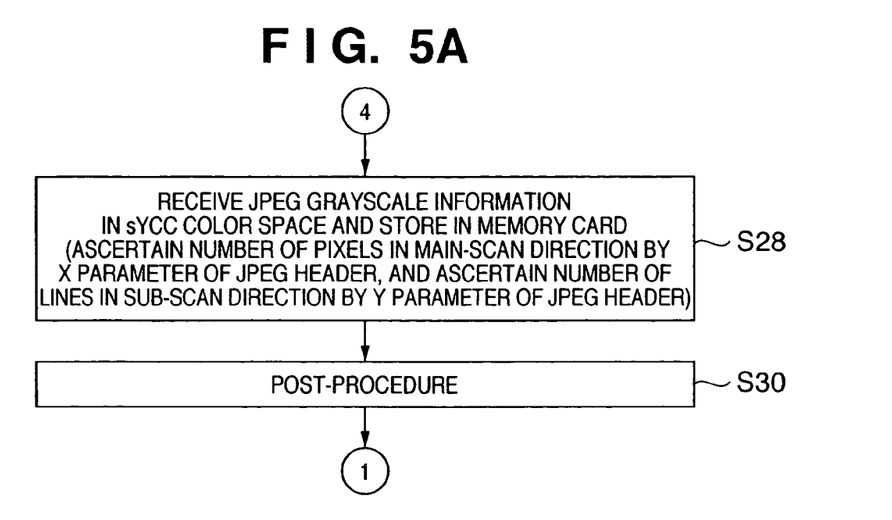

The JPEG grayscale information in sYCC color space is received and stored in the removable memory card 30 at S28 (FIG. 5A). Here reference is had to the JPEG header to ascertain, by its X parameter, the number of pixels of the received JPEG image in the main-scan direction and, by its Y parameter, the number of lines of the received JPEG image in the sub-scan direction. That is, when the transmitter transmits full-color information in sYCC color space, the main-scan direction is defined solely by the number of bits and the sub-scan direction is defined solely by the number of lines.

A post-procedure is executed at S30 and then control returns to S6.

If a "NO" decision is rendered at step S24, i.e., if bits X, (X+1) are both "0", then it is determined at S32 (FIG. 5B) whether bit 68 of the FIF in the DCS is "1" (whether JPEG encoding in Lab color space is valid). Control proceeds to S34 if the decision at S32 is "YES" and to S46 (FIG. 6C) if the decision is "NO", i.e., if bits 68, 69 of the FIF in the DCS are both "0".

Figure 5B:
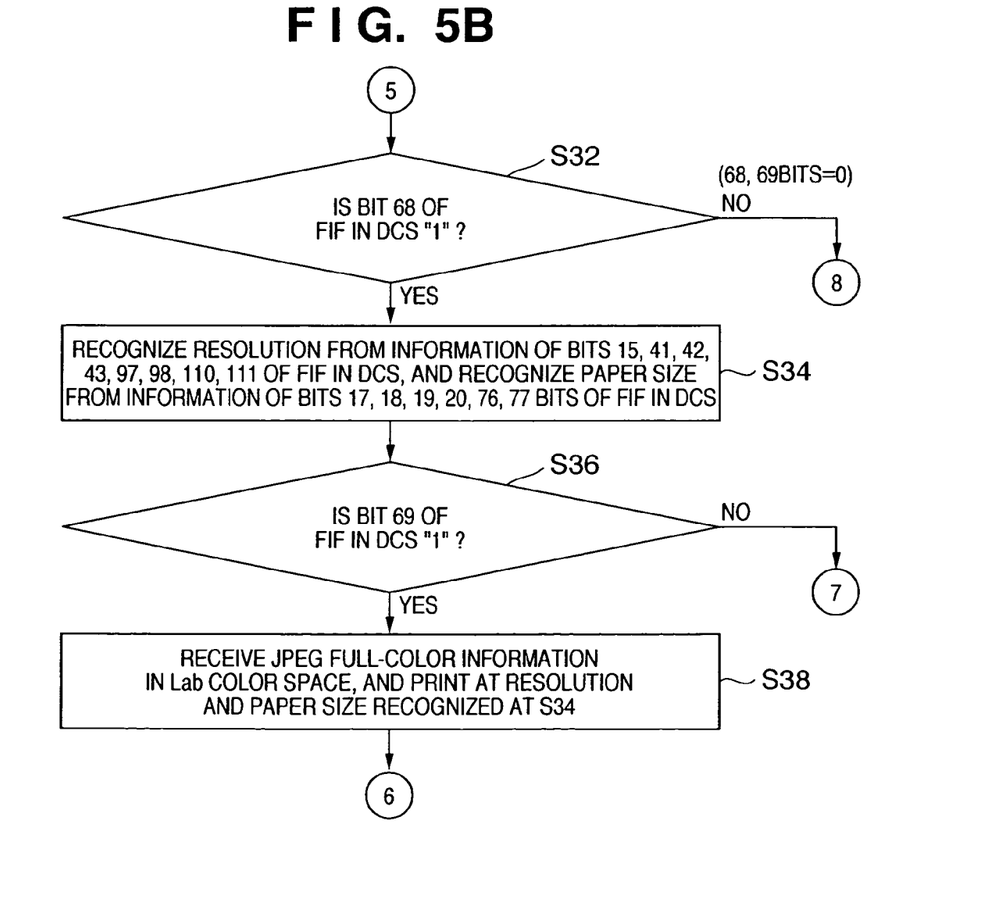

If JPEG encoding in Lab color space has been specified, then resolution is recognized from the information of bits 15, 41, 42, 43, 97, 98, 110, 111 of the FIF in the DCS and paper size is recognized from the information of bits 17, 18, 19, 20, 76 and 77 of the FIF in the DCS at S34.

Next, it is determined at S36 whether bit 69 of the FIF in the DCS is "1" (whether the full-color mode in Lab color space has been specified). Control proceeds to S38 if the answer is "YES" and to S42 (FIG. 6B) if the answer is "NO".

At step S38, JPEG full-color information in Lab color space is received and printing is performed at the resolution and paper size recognized at step S34.

A post-procedure is executed at S40 (FIG. 6A) and then control returns to S6.

If a "NO" decision is rendered at S36, i.e., if bit 69 of the FIF in the DCS is "0", then, at S42 (FIG. 6B), JPEG grayscale information in Lab color space is received and printing is performed at the resolution and paper size recognized at step S34.

Figure 6A:
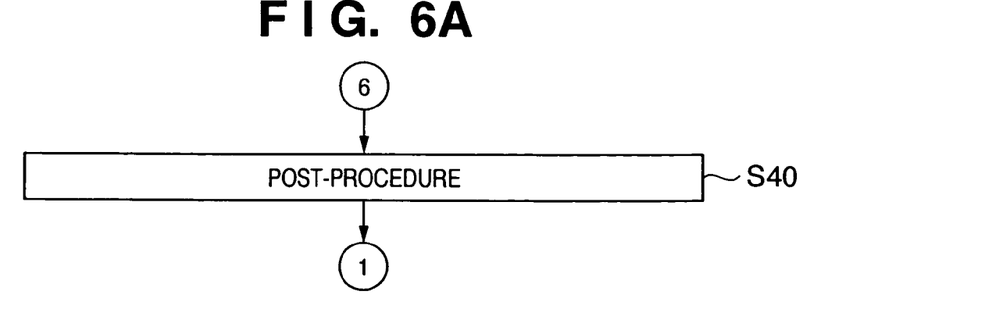
Figure 6B:
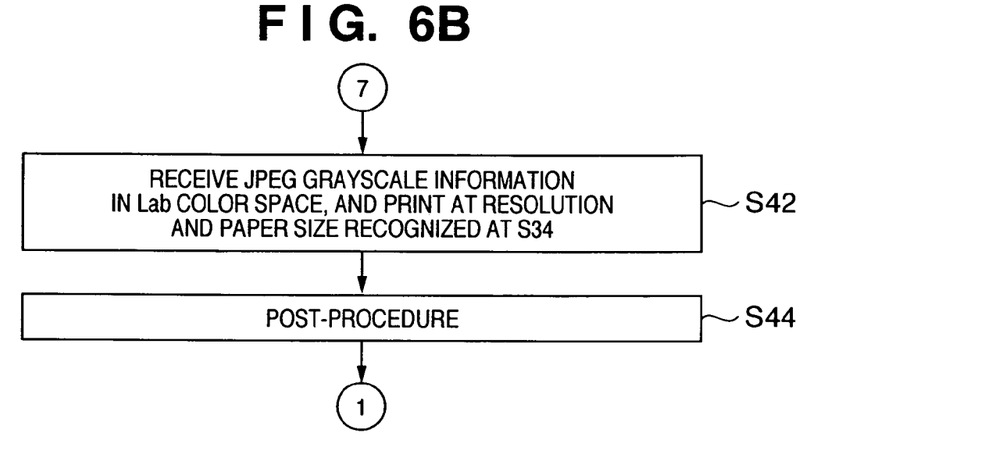

A post-procedure is executed at S44 and then control returns to S6.

If a "NO" decision is rendered at S32, i.e., if bits 68 and 69 of the FIF in the DCS are both "0", then, at S46 (FIG. 6C), resolution is recognized from the information of bits 15, 41, 42, 43, 105, 106, 107, 108 and 109 of the FIF in the DCS and paper size is recognized from the information of bits 17, 18, 19, 20, 76 and 77 of the FIF in the DCS.

Figure 6C:
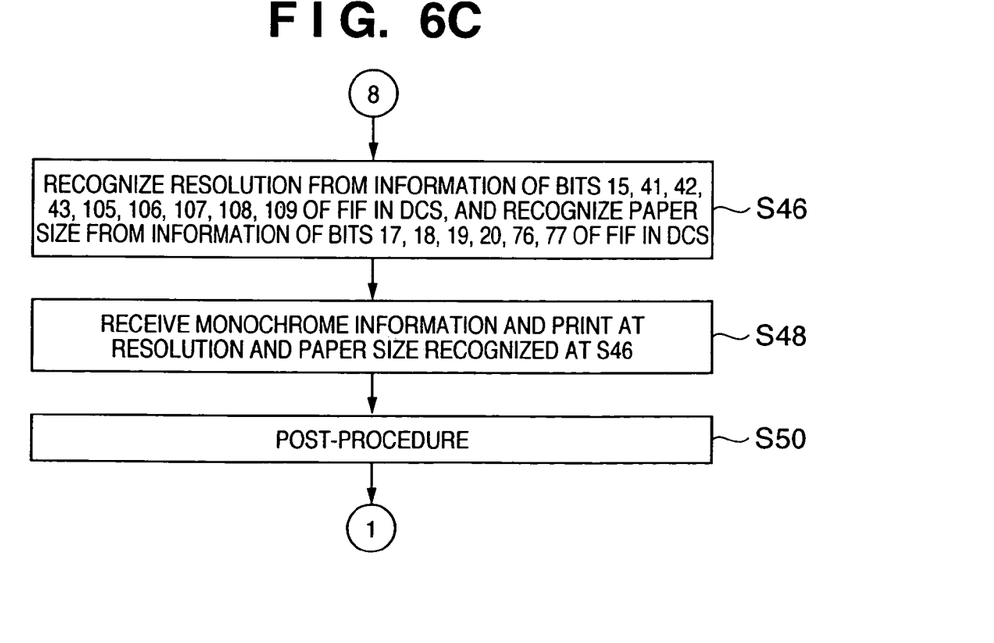

At S48, monochrome information is received and printing is performed at the resolution and paper size recognized at S46.

A post-procedure is executed at S50 and then control returns to S6.

If a "NO" decision is rendered at S8 in FIG. 3, control proceeds to S10, where other processing is executed. When this other processing ends, control proceeds to S52.

It is determined at S52 whether information has been stored in the removable memory card 30. Control proceeds to S54 if the answer is "YES" and returns to S6 if the answer is "NO".

At S54, the information that has been stored is displayed on the display unit of the control panel 20 by a predetermined method, e.g., in the form of thumbnail images or in accordance with information such as date received, name of the other party, etc. In addition, it is determined whether a print command has been issued from the control panel 20. Control proceeds to S56 (FIG. 7) if the answer is "YES" and returns to S6 if the answer is "NO".

Figure 7:
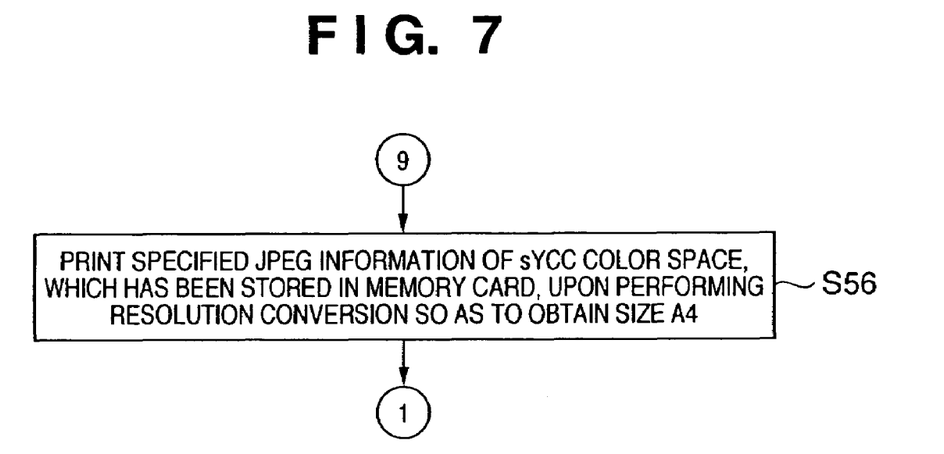

Of the information (JPEG information in sYCC color space) that has been stored in the memory card 30, that designated by the control panel 20 is subjected to a resolution conversion (scaling) and printed at S56 in such a manner that a prescribed size (assumed to be size A4 in this embodiment) conforming to the printing paper will be obtained.

More specifically, it will suffice to perform scaling and printing while maintaining the ratio of X and Y based upon the X, Y information in the JPEG header in such a manner that printing will be carried out at a suitable paper size (e.g., a paper size that will not require a size reduction or one for which only a small reduction rate will suffice) from among paper sizes capable of being printed by the printing circuit 16.

Next, operation will be described for a case where the facsimile apparatus of this embodiment operates as a transmitting machine.

First, it is determined whether transmission of a document set in the reading circuit 14 has been specified or whether transmission of image information stored in the memory card 30 has been specified. By way of example, this determination can be made by displaying a selection GUI (Graphic User Interface) on the display unit of the control panel 20 and detecting what has been selected.

If transmission of a document image has been specified, a transmission is performed in a manner similar to that of the conventional color facsimile apparatus except for the fact that bit X and bit (X+1) of the FIF in the DCS are both made "0". In other words, the document image is read (scanned in) by the reading circuit 14 and transmitted.

On the other hand, if transmission of image information stored in the memory card 30 has been specified, bit X of the FIF in the DCS is set to "1" and bit (X+1) is set to "1" or "0" depending upon whether the specified image information is full color or grayscale. At the same time, the above-mentioned bits relating to resolution and image width (bits 15, 41, 42, 43, 97, 98, 105, 106, 107, 108, 109, 110, 111, 17, 18, 19, 20, 76 and 77) of the FIF in the DCS are made any preset values (or are left as is). Except for this, image information is transmitted through a procedure the same as that of the conventional color facsimile apparatus.

(Modification)

In the above embodiment, the DIS and DCS both define both of bits X and (X+1) of the FIF. However, it will suffice to define only bit X and not bit (X+1).

In such case bit X of the FIF in the DIS notifies of absence/presence of the grayscale or color (sYCC color space) JPEG receive function, and bit X of the FIF in the DCS specifies grayscale or color (sYCC color space) JPEG transmission.

Figure 8:
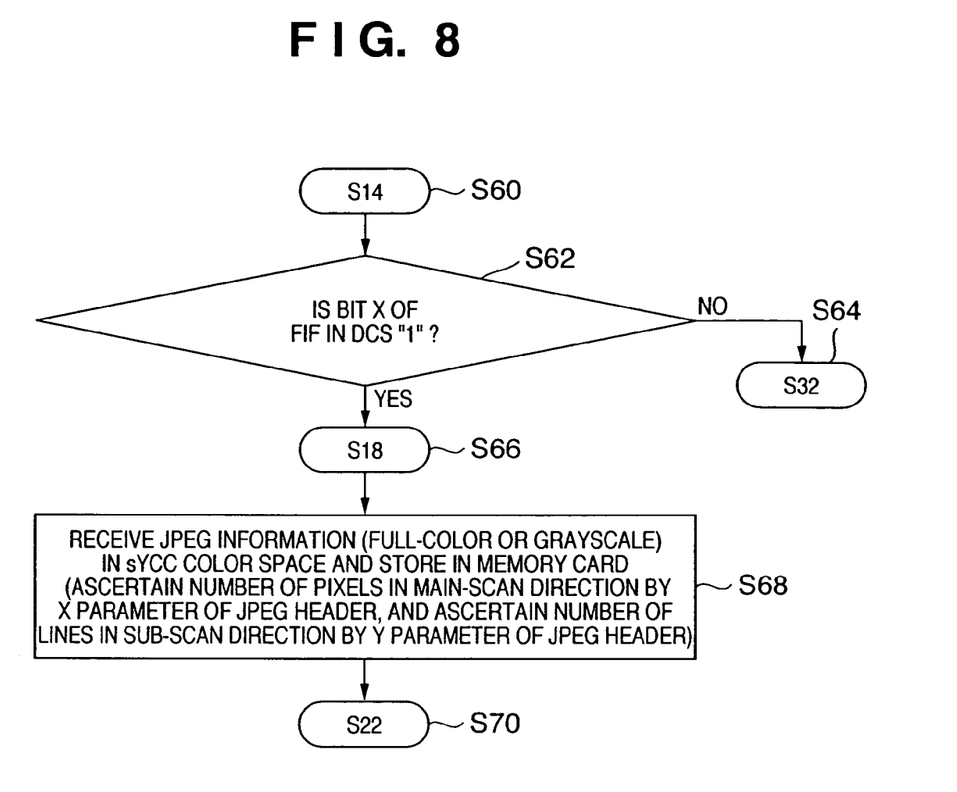
FIG. 8 is a flowchart for describing the operation of a facsimile apparatus according to a modification of this embodiment.

Receive processing in this case will be described with reference to the flowchart of FIG. 8. The description will focus on processing that differs from that described above with reference to FIGS. 3 to 7.

First, processing (S60) is executed as set forth in FIG. 3 with regard to step S0 to S14. This is followed by S62, at which it is determined whether bit X of the FIF in the DCS is "1" or not. If the decision rendered is "YES" (bit X is "1"), then the processing of S18 is executed (S66) in a manner similar to that in the case where bit X and bit (X+1) are both "1" in the above-described processing. JPEG information (grayscale or color) in sYCC color space sent from the transmitting side is received and stored in the memory card 30 at S68. Here reference is had to the JPEG header to ascertain, by its X parameter, the number of pixels of the received JPEG image in the main-scan direction and, by its Y parameter, the number of lines of the received JPEG image in the sub-scan direction.

A post-procedure similar to that of S22 is executed at S70 and then control returns to S6.

If a "NO" decision is rendered at S62, i.e., if bit X of the FIF in the DCS is "o", then control proceeds to S64 and processing is executed from step S32 onward in FIG. 5B.

[Other Embodiments]

The above embodiment has been described taking as an example image information in Lab color space as image information for which resolution information and image-width information is obtained, and image information in sYCC color space as image information for which these items of information are not obtained. However, the present invention is such that the range of application is limited to image information in these specific color spaces.

The essence of the present invention is as follows: On the transmitting side, a case where resolution information or image-width information concerning an image to be transmitted is capable of being obtained directly (transmission of document information), as when the image has been read directly, and a case where such information is not obtained (transmission of non-document information) are specified on the transmitting side, and if non-document information is transmitted, resolution information and original-width information is not generated as by a file conversion. On the receiving side, if transmission of non-document information has been specified, then resolution information and image-width information provided by the usual procedure is ignored and information is obtained from the image information received.

It should be noted that the present invention also covers a case where software programs for implementing the functions of the above embodiment (programs corresponding to the flowcharts illustrated in FIGS. 3 to 6C in the above embodiment) are supplied directly from a recording medium, or through use of wired/wireless communication, to a system or apparatus having a computer that is capable of executing the above-mentioned programs, and the system or apparatus executes the supplied programs to thereby implement the equivalent functions.

Accordingly, program code per se supplied to and installed in a computer in order that the computer may execute the processing of the present invention also implements the invention. In other words, the computer program that implements the processing of the present invention also is covered by the present invention.

In this case, so long as the system or apparatus has the functions of the program, the form of the program, e.g., object code, a program executed by an interpreter or script data supplied to an operating system, etc., does not matter.

Examples of computer-readable recording media by which the program can be supplied are magnetic recording media such as floppy disk, hard disk and magnetic tape, optical/magneto-optical storage media such as a magneto-optical disk, CD-ROM, CD-R, CD-RW, DVD-ROM, DVD-R and DVD-RW, and a non-volatile semiconductor memory.

As for the method of supplying the program using wired/wireless communication, the computer program itself for forming the present invention in the server of a computer network, or a data file (program-data file) that can serve as a computer program for forming the present invention in a client computer, such as a compressed file having an automatic install function, can be stored and the program-data file can be downloaded to a connected client computer. In such case the program-data file can be divided into a plurality of segment files and the segment files can be deployed at different servers.

In other words, the present invention also covers a server apparatus that allows multiple users to download a program-data file for the purpose of implementing the functions of the present invention by computer.

Further, it is also possible to encrypt and store the program of the present invention on a computer-readable storage medium such as a CD-ROM, distribute the storage medium to users, allow users who meet certain requirements to download decryption key information from, e.g., a web-site via the Internet, and allow these users to run the encrypted program by using the key information, whereby the program is installed in the user computer.

Furthermore, besides the case where the aforesaid functions according to the embodiment are implemented by executing the read program by computer, an operating system or the like running on the computer can perform all or a part of the actual processing based upon commands in the program so that the functions of the foregoing embodiments are be implemented by this processing.

Furthermore, after the program read from a recording medium is written to a function expansion board inserted into the computer or to a memory provided in a function expansion unit connected to the computer, a CPU or the like mounted on the function expansion board or function expansion unit can perform all or a part of the actual processing based upon commands in the program so that the functions of the foregoing embodiments can be implemented by this processing.

Thus, in accordance with the present invention, as described above, the transmitting side gives notification of transmission of non-document information, such as JPEG full-color image information in sYCC color space captured by a digital camera. When the receiving side receives such notification, the receiving side decides resolution and image width using the number of pixels defined by the header of the JPEG file. This makes unnecessary the task of converting information relating to a non-document image and generating resolution information and document-width information on the transmitting side. This makes it possible to implement the invention by utilizing existing protocols.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus that communicates color-file information, comprising:

determination means for determining whether a received color file is color-file information in a first color space or color-file information in a second color space different from the first color space; and output means which is for, in a case where both a JPEG header including an X parameter and a Y parameter and a digital control signal (DCS) including resolution information and image-width information are received and where color-file information in the first color space is received, executing output processing using the resolution information and the image-width information included in the received DCS but without using information of the X parameter and the Y parameter in the received JPEG header, and in a case where both a JPEG header including an X parameter and a Y parameter and a DCS including resolution information and image-width information are received and where color-file information in the second color space is received, executing output processing using information of the X parameter and the Y parameter in the received JPEG header but without using the resolution information and the image-width information included in the received DCS, wherein the DCS includes at least one information bit indicative of color-file information in the second color space, and said determination means makes the determination based upon said information bit.

2. The apparatus according to claim 1, wherein in a case where a color file in the second color space is printed, said output means acquires information of the X parameter and the Y parameter from the JPEG header of the color file, applies a resolution conversion in such a manner that the color file can be printed on printing paper of a prescribed size while maintaining a ratio of X and Y, and then prints the color file on the printing paper of the prescribed size.

3. A facsimile communication method for color-file information, comprising:

a determination step of determining whether a received color file is color-file information in a first color space or color-file information in a second color space different from the first color space; and an output step which is a step of, in a case where both a JPEG header including an X parameter and a Y parameter and a digital control signal (DCS) including resolution information and image-width information are received and where color-file information in the first color space is received, executing output processing using the resolution information and the image-width information included in the received DCS but without using information of the X parameter and the Y parameter in the received JPEG header, and in a case where both a JPEG header including an X parameter and a Y parameter and a DCS including resolution information and image-width information are received and where color-file information in the second color space is received, executing output processing using information of the X parameter and the Y parameter in the received JPEG header but without using the resolution information and the image-width information included in the received DCS, wherein the DCS includes at least one information bit indicative of color-file information in the second color space, and said determination step makes the determination based upon said information bit.

4. A program, stored in computer-executable form in a computer-readable storage medium, for causing a computer, which is capable of implementing facsimile communication, to execute a facsimile communication method having:

a determination step of determining whether a received color file is color-file information in a first color space or color-file information in a second color space different from the first color space; and an output step which is a step of, in a case where both a JPEG header including an X parameter and a Y parameter and a digital control signal (DCS) including resolution information and image-width information are received and where color-file information in the first color space is received, executing output processing using the resolution information and the image-width information included in the received DCS but without using information of the X parameter and the Y parameter in the received JPEG header, and in a case where both a JPEG header including an X parameter and a Y parameter and a DCS including resolution information and image-width information are received and where color-file information in the second color space is received, executing output processing using information of the X parameter and the Y parameter in the received JPEG header but without using the resolution information and the image-width information included in the received DCS, wherein the DCS includes at least one information bit indicative of color-file information in the second color space, and said determination step makes the determination based upon said information bit.

5. A computer-readable recording medium storing a computer-executable program for causing a computer, which is capable of implementing facsimile communication, to function as a facsimile apparatus that comprises:

determination means for determining whether a received color file is color-file information in a first color space or color-file information in a second color space different from the first color space; and output means which is for, in a case where both a JPEG header including an X parameter and a Y parameter and a digital control signal (DCS) including resolution information and image-width information are received and where color-file information in the first color space is received, executing output processing using the resolution information and the image-width information included in the received DCS but without using information of the X parameter in the Y parameter in the received JPEG header, and in a case where both a JPEG header including an X parameter and a Y parameter and a DCS including resolution information and image-width information are received and where color-file information in the second color space is received, executing output processing using information of the X parameter and the Y parameter in the received JPEG header but without using the resolution information and the image-width information included in the received DCS, wherein the DCS includes at least one information bit indicative of color-file information in the second color space, and said determination means makes the determination based upon said information bit.

* * * * *